United States Patent

[11] 3,571,942

| [72] | Inventors | Henry E. Orensten;<br>Vivian C. Orensten, 2648 Inglewood Ave.<br>S., Minneapolis, Minn. 55416 |
|---|---|---|
| [21] | Appl. No. | 856,216 |
| [22] | Filed | Sept. 8, 1969 |
| [45] | Patented | Mar. 23, 1971 |

[54] PROCESS FOR PRESERVING FLOWERS
9 Claims, No Drawings

[52] U.S. Cl. .................................................... 34/9, 34/17
[51] Int. Cl. ........................................................ F26b 3/00, F26b 5/00

[50] Field of Search........................................... 34/9, 12, 17, 19, 42

[56] References Cited
UNITED STATES PATENTS
2,105,688   1/1938   Fessenden ...................   34/9X

*Primary Examiner*—John J. Camby
*Attorney*—Alan G. Greenberg

ABSTRACT: This invention relates to a process for drying and naturally preserving flowers and flower color. The process includes controlled pressing the flower between porous sheets, while maintaining a heated dehumidified atmosphere.

PROCESS FOR PRESERVING FLOWERS

This invention involves a process for preserving flowers and other vegetable matter to reserve the natural coloration of the object.

Processes presently in use for the purpose employ chemical treatment of the flower. The chemicals either detract from the natural color or add an artificial cast to the flower, preventing a natural appearance.

In the present process the flower is rapidly dried and pressed and maintains the natural colors.

The process is comprised of selecting and picking flowers at the peak of coloration.

The colorful flowers are then arranged in the desired pattern and placed between layers of relatively smooth surfaced porous paper.

An atmosphere of heated air is forced through the porous paper. The heated air must be hot enough to drive out the moisture in the flower, but not so hot as to cook it, destroying the natural colors. The most suitable range of temperatures for the heated air has been found to be between 85° F. and 125° F. The higher temperatures, however, provide a more rapid drying rate, which is desirable.

The heated atmosphere surrounding the flowers is to be dehumidified so as to draw off moisture purged from the flower.

The drying process may be divided into two segments, the first, during which most of the moisture is purged, and the second, during which the flower is substantially dry. The first drying period is approximately 36 hours long, and the second from 12 to 84 hours in length depending upon flower size and temperature of the heated atmosphere.

During the drying period a pressure is maintained on the flower. This may be in the form of a weight placed on the horizontally oriented porous paper layers. During the first drying period, the weight is substantially greater than during the second period. It is obvious that any method for maintaining pressure on the flowers may be employed, including spring pressure in lieu of, or in addition to, the weights previously described.

Flowers processed in the foregoing manner will not lose the natural color that they have when picked and may be employed for many purposes, including art works and the like.

We claim:

1. A process for drying flowers and vegetable materials to preserve the natural coloration comprising: Placing the flower between layers of relatively smooth surfaced porous paper; forcing heated air through said porous paper to the flowers; placing pressure on the flowers; dehumidifying the atmosphere surrounding the flowers.

2. The process of claim 1 further characterized by the heated air being heated to a temperature between 85° F. and 125° F.

3. The process of claim 1 further characterized by the pressure being applied by weights on horizontally oriented porous paper.

4. The process of claim 3 further characterized by the process including two drying periods.

5. The process of claim 4 further characterized by the first drying period being approximately 36 hours and the second drying period being between 12 hours and 84 hours.

6. The process of claim 2 further characterized by the pressure being applied by weights on horizontally oriented porous paper.

7. The process of claim 6 further characterized by the process including two drying periods.

8. The process of claim 7 further characterized by the first drying period being approximately 36 hours and the second drying period being between 12 hours and 84 hours.

9. The process of claim 2 further characterized by the pressure being maintained on the flowers by spring tension.